United States Patent
Ch'ng et al.

(10) Patent No.: US 7,112,781 B2
(45) Date of Patent: Sep. 26, 2006

(54) ABSOLUTE ENCODER

(75) Inventors: Sheau Yang Ch'ng, Penang (MY); Frank Kwong Yew Kiu, Sarawak (MY); Mee Choo Ong, Penang (MY)

(73) Assignee: Avago Technologies ECBU IP (Singapore) Pte. Ltd., Singapore (SG)

( * ) Notice: Subject to any disclaimer, the term of this patent is extended or adjusted under 35 U.S.C. 154(b) by 0 days.

(21) Appl. No.: 10/829,494

(22) Filed: Apr. 21, 2004

(65) Prior Publication Data

US 2005/0236560 A1   Oct. 27, 2005

(51) Int. Cl.
   *G01D 5/34* (2006.01)
(52) U.S. Cl. .............................. 250/231.13; 250/231.18
(58) Field of Classification Search ........... 250/231.13, 250/231.14, 231.18, 214.1, 214 R, 208.1, 250/208.6, 555
   See application file for complete search history.

(56) References Cited

U.S. PATENT DOCUMENTS

| | | | | |
|---|---|---|---|---|
| 4,463,089 A | * | 7/1984 | Bouldin | 430/617 |
| 5,210,409 A | * | 5/1993 | Rowe | 250/227.18 |
| 5,936,236 A | * | 8/1999 | Setbacken et al. | 250/231.13 |
| 6,093,928 A | * | 7/2000 | Ohtomo et al. | 250/231.13 |

* cited by examiner

*Primary Examiner*—Georgia Epps
*Assistant Examiner*—Kevin Wyatt

(57) ABSTRACT

An apparatus having a code strip carrier that is illuminated by an illumination system and a plurality of read heads is disclosed. Each code track includes a plurality of dark and light stripes. Each read head is positioned to detect light from a corresponding one of the code tracks as that code track moves relative to the read head, the read head generating a signal indicative of the intensity of light reaching that read head. One of the code tracks includes a first absolute position track that provides an indication of the absolute position value when the code strip carrier is at each of a plurality of predetermined absolute positions relative to the origin position. A different one of the code tracks includes an incremental position track for generating a digital value indicative of a displacement of the code strip carrier relative to the last predetermined absolute position.

8 Claims, 4 Drawing Sheets

ABSOLUTE ENCODER

BACKGROUND OF THE INVENTION

An absolute encoder provides a readout of the position of an apparatus relative to some predetermined location. For example, an absolute shaft encoder provides a readout of the number of degrees the shaft would need to be rotated to return to a predetermined starting position.

Conventional absolute encoders utilize a series of fiducial marks and detectors to provide the above-described readout. In general, if the device provides an N-bit readout of the location, there are N separate sets of fiducial marks, one per bit. The marks for each set are arranged as a "track". There are also N separate detectors, one per track. The fiducial marks are normally placed on the moving apparatus, and the detectors are placed on a device that is fixed relative to the moving apparatus such that each set of fiducial marks moves past the corresponding detector as the apparatus moves. Each detector provides a signal when one of the associated fiducial marks passes the detector. However, systems in which the detectors are on the moving apparatus and the fiducials are on the fixed surface are also known.

This type of arrangement has severe alignment requirements that substantially increase the cost of encoders based on this type of design. In particular, the individual sets of fiducial marks must be aligned relative to one another. Similarly, detectors must also be aligned relative to one another. The alignment tolerance is determined by the smallest distance that is to be resolved. Hence, systems in which N is large are particularly costly both in terms of the number of encoding tracks and detectors and in terms of the alignment costs.

SUMMARY OF THE INVENTION

The present invention includes an apparatus having a code strip carrier that is illuminated by an illumination system and a plurality of read heads. The code strip carrier has a plurality of code tracks. Each code track includes a plurality of dark and light stripes, the dark stripes generating a light signal having a lower intensity than the light signal generated by the light stripes. Each read head includes a photodetector positioned to detect light from a corresponding one of the code tracks as that code track moves relative to the read head, the read head generating a signal indicative of the intensity of light reaching that read head. A controller generates an absolute position value related to the position of the code strip carrier relative to an origin position. One of the code tracks includes a first absolute position track that provides an indication of the absolute position value when the code strip carrier is at each of a plurality of predetermined absolute positions relative to the origin position. A different one of the code tracks includes an incremental position track for generating a digital value indicative of a displacement of the code strip carrier relative to the last predetermined absolute position. In one embodiment, the first absolute position track includes a plurality of unique code sequences distributed on the absolute position track. Each code sequence indicates that one of the predetermined absolute positions has been passed when a predetermined stripe in that code sequence has passed the read head corresponding to the absolute position track. In one embodiment, the incremental position track includes alternating dark and light stripes and the read head corresponding to the incremental position track generates a first logic signal indicating the direction of travel of the code strip carrier relative to that read head and a second logic signal that changes state each time a boundary between a dark stripe and a light stripe passes under that read head. In one embodiment, the code strip carrier includes a reflective medium having a reflectivity that is altered by exposing the medium to light of an intensity greater than a predetermined intensity. In one embodiment, one of the tracks includes a state track that provides a state value corresponding to each of a plurality of the absolute position values, and the controller outputs the state value and the absolute position value.

DETAILED DESCRIPTION OF THE PREFERRED EMBODIMENTS OF THE INVENTION

Figure 1:
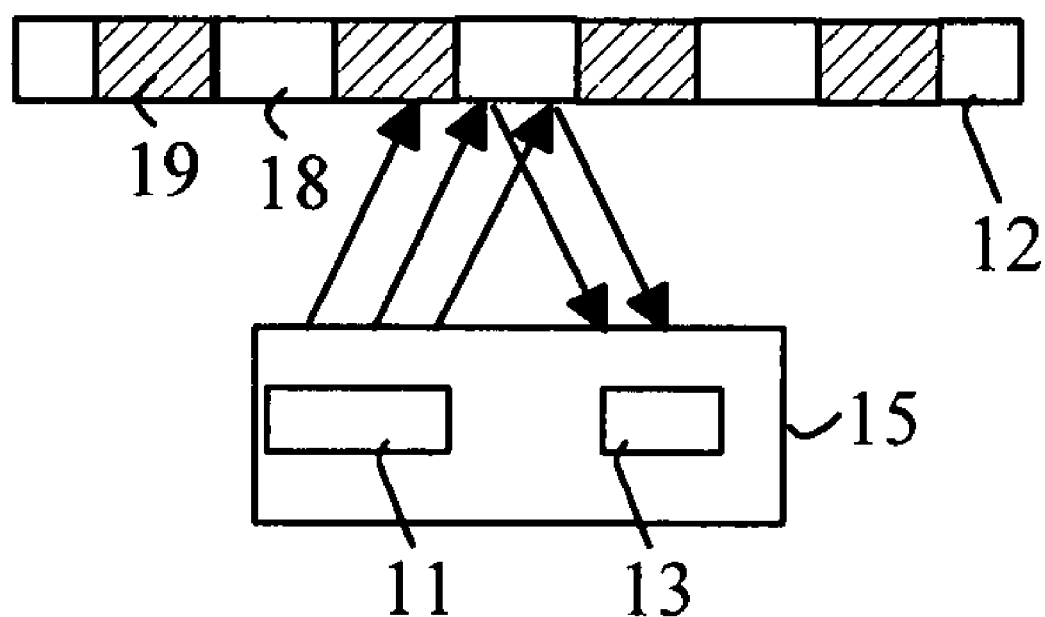
FIG. 1 illustrates a reflective encoder.

Refer now to FIG. 1, which illustrates a reflective encoder. The encoder can be divided into an emitter/detector module 15 and a code wheel or code strip. Module 15 includes an emitter 11 that illuminates a portion of the code strip 12. A detector 13 views the illuminated code strip. The emitter typically utilizes an LED as the light source. The detector is typically based on one or more photodiodes. In reflective encoders, the code strip includes reflective stripes 18 and absorptive stripes 19. The emitter includes a collimating optic such as a lens. The light from the emitter is reflected or absorbed by the stripes on the code strip. The reflected light is imaged onto the photodiodes in the detector. The output from the photodetectors is again converted to a logic signal.

To simplify the following discussion, drawings depicting the image of the code strip and the surface area of the photodetectors on which the image is formed will be utilized. In each drawing, the image of the code strip will be shown next to the photodiode array to simplify the drawing. However, it is to be understood that, in practice, the image of the code strip would be projected onto the surface of the photodiode array. In addition, to further simplify the drawings, the light source and any collimating or imaging optics are omitted from the drawings.

Figure 2:
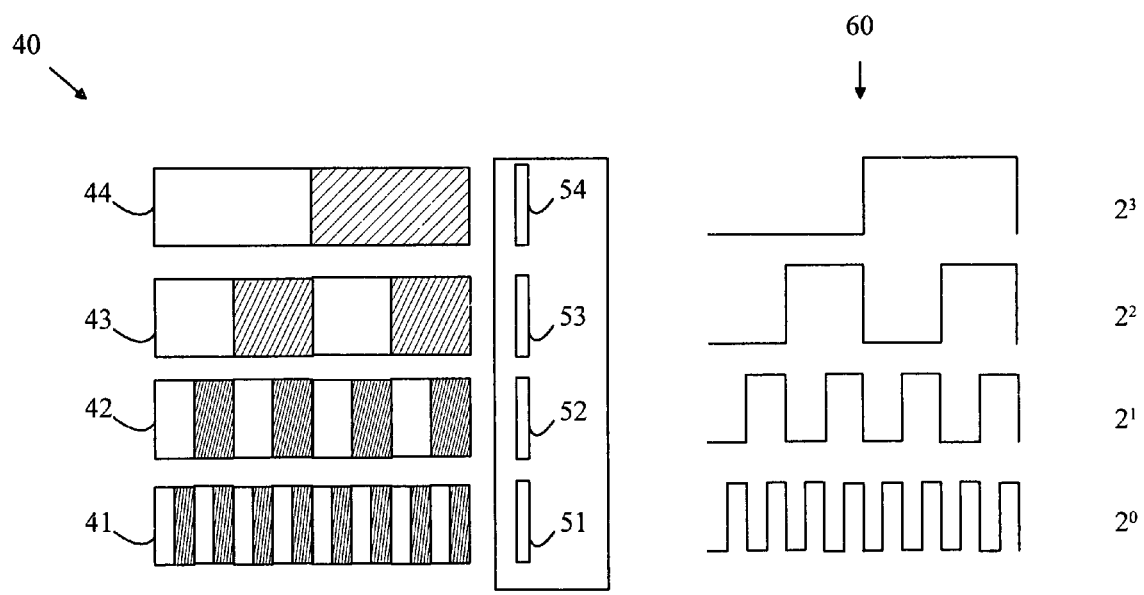
FIG. 2 illustrates a conventional 4-bit absolute encoder.

Refer now to FIG. 2, which illustrates a conventional 4-bit absolute encoder 40. The code strip image pattern of stripes is shown at 41–44. Each code strip pattern is viewed by a corresponding photodiode. The photodiodes corresponding to patterns 41–44 are shown at 51 to 54, respectively. The signals from the photodiodes are shown at 60 for the 4 bits corresponding to $2^0$ to $2^3$. As can be seen from this figure, the 4-bit absolute encoder requires 4 tracks, each having a code strip and a photodiode. As noted above, an n-bit absolute encoder requires n-code strips and n-photodiodes that must be aligned with the code strip images and each other.

It should also be noted that the scheme shown in FIG. 2 assumes that the width of the photodetector is much smaller than the width of the stripes on the code strip, and hence, the transition between a light and dark stripe gives rise to an abrupt transition in the corresponding photodiode output. However, there is a lower limit on the size of a photodiode that is imposed by photolithography and by the signal to noise ratio required by the detection scheme. As the photodiode area is reduced, the amount of light that is converted to charge in the device also decreases. Unfortunately, the amplification noise and other noise signals do not decrease proportionally to the decrease in size. At some point, there is too little charge to provide reliable edge detection.

Figure 3:
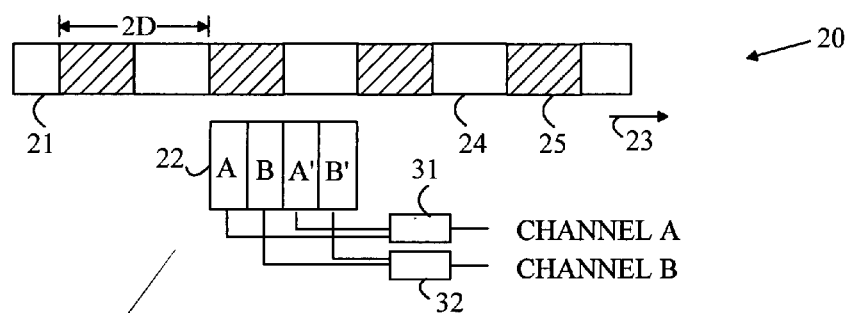
FIGS. 3–5 illustrate a prior art two-channel encoder incremental encoder.

Refer now to FIG. 3, which illustrates a prior art two-channel encoder 20 design that has been utilized in single track encoders that detect the relative motion of the code strip. Encoder 20 reduces the problems associated with reducing the photodiode area by using photodiodes having active areas that are much wider than the transition region between code stripes. Encoder 20 includes a code strip that is imaged to form an image 21 that is viewed by a detector array 22. The image 21 of the code strip consists of alternating "white" and "black" stripes shown at 24 and 25, respectively. Denote the width of each stripe in the direction of motion of the code strip by D. The direction of motion is indicated by arrow 23. For the purposes of this example, it will be assumed that when a white stripe is imaged on a detector, the detector outputs its maximum signal value, and when a black stripe is imaged on the detector, the detector outputs its minimum value. It will also be assumed that the detector outputs an intermediate value when only a portion of a white stripe is imaged onto the detector.

Figure 4:
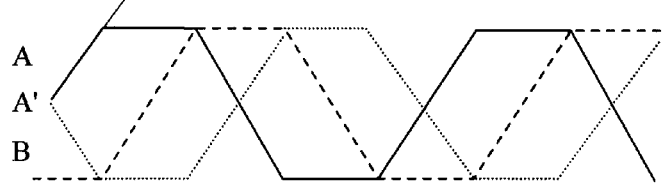

Detector array 22 is constructed from 4 photodetectors labeled A, A', B, and B'. Each photodetector has an active area with a width equal to D/2. The A' and B' detectors are positioned such that the A' and B' detectors generate the complement of the signal generated by the A and B detectors, respectively. The outputs of the A, A', and B photodetectors are shown in FIG. 4, which is a graph of the amplitude of the output of each photodetector as a function of position of the code strip image. To simplify FIG. 4, the output of the B' photodetector has been omitted.

Figure 5:
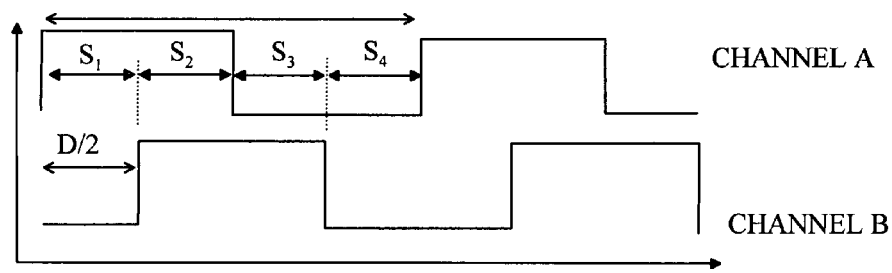
Figure 6:
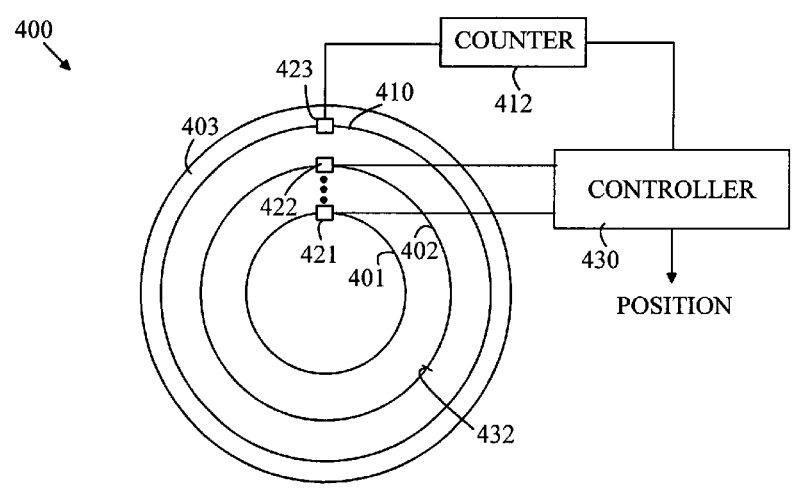
FIG. 6 illustrates an encoder 400 according to one embodiment of the present invention.

The signals generated by these detectors are combined by detector circuits 31 and 32 to generate two logic channel signals that are 90 degrees out of phase as shown in FIG. 5. FIG. 6 illustrates the channel A and channel B signals when the code strip is moving in the direction shown by arrow 23 in FIG. 5. If the code strip were to move in the opposite direction, the channel B signal would lead the channel A signal; however, the two signals would still be 90 degrees out of phase.

Circuits for converting the photodiode output signals to the channel signals shown in FIG. 5 are known in the art, and hence, will not be discussed in detail here. For the purposes of this discussion, it is sufficient to note that the channel signal corresponding to a pair of photodiode output signals such as A and A' switches between logical one and logical zero at the points at which the output of detector A is equal to the output of detector A'.

The two channel signals provide a measurement of the direction of motion of the image of the code strip relative to the detector array. In addition, the two channel signals define 4 states that divide the distance measured by one black and one white stripe into quarters. The 4 states correspond to a two-bit binary number in which the first bit is determined by the value of the channel A signal and the second bit is determined by the value of the channel B signal. Hence, this type of system has an accuracy equal to half of the width of one of the stripes.

While a single track using the two channel coding scheme discussed above can be utilized to provide an incremental encoding scheme by incrementing or decrementing a counter on each rising edge of one of the channel signals depending on the direction of travel, this track measurement scheme does not provide a reliable absolute position measurement. In principle, the channel signals can be counted in a register that is reset when a fiducial mark is encountered by another detector to provide a correspondence between the counter value and the absolute position of the code strip relative to the position of the fiducial mark. However, any error in the counting circuitry between the times at which the fiducial mark is encountered will lead to position errors.

Hence, schemes that encode an absolute position in one or more additional tracks are utilized when absolute position information is important. One method for providing the absolute code is to utilize a code track for each bit of the absolute position as described above. However, this requires a large number of tracks and detectors that must be aligned to one another.

A second method for providing the absolute position utilizes a coding scheme in which the stripes on a track are arranged such that a sequence of stripes provides a coded value that is related to the absolute position of one of the stripes in the sequence. For example, if the reflective stripes code a logical one and the non-reflective stripes code a logical zero, then the sequences of bits can be utilized to encode the absolute position of the track relative to the read head at some predetermined point in the code sequence. If there are N possible bit positions around the track, a code having a minimum length of log(N) is required. However, to provide error detection and correction capabilities, the codes used in practice are significantly larger than this minimum value. Codes that are adapted to this type of coding scheme are well known in the art.

For example, Gray codes are often utilized in this type of absolute encoding scheme. A Gray code is a mapping from a multi-bit code set to a set of sequential states. In general, there are many more code values than states, and hence, the coding scheme can detect errors. In the case of a Gray code, the next sequential state is obtained by changing the least significant bit that produces a new valid numerical state. Accordingly, if a single bit error occurs, it is usually detected because it leads to an illegal state relative to the current state.

At startup, the position of the encoding wheel relative to the read head is not necessarily known. Hence, the encoder must wait for the start of the next absolute position code sequence to determine the location of the code wheel. Hence, the coding scheme must allow the beginning of a code sequence to be identified either by utilizing a unique start sequence or by utilizing a coding scheme in which a code sequence can be uniquely identified by the sequence of bits even when the relationship between the read head and the sequence is not known at the time the read head starts recording bits in the sequence. In either case, the effective length of the code sequence must be increased beyond the minimum length corresponding to the number of states.

Between the time at which a code sequence is identified specifying the absolute position of the encoding disk and the next time at which such a coding sequence is identified, the absolute position of the disk is not known. Since the code sequences must be significantly larger than a single bit to provide both the state number and the error detecting capabilities discussed above, the number of stripes over which the absolute position is not known can be quite large unless some form of interpolation scheme is utilized. In principle, transitions between the individual bits of the position code can be used to identify intermediate disk positions; however, the positional accuracy of such a measurement is limited by code values having successive runs of ones or zeros, since such sequences do not contain a transition at each bit boundary. For example, in a scheme in which the dark stripes encode a zero and the white stripes encode a one, a run of N zeros is a white stripe having a length of N times the length of a one-bit stripe. Other interpolation schemes based on the assumption that the disk is moving with a constant speed can also be used; however, such assumptions are not always valid. For example, if the disk rotation direction is reversed, the position decoder will be in error from the time of the rotation reversal to the time a new absolute encoding value is detected.

The present invention avoids these difficulties by utilizing a coded track to provide periodic absolute position measurements together with a finely divided incremental track that interpolates between the periodic position measurements. In addition, the present invention utilizes an encoding disk that is similar to that utilized in DVD and CD recording to provide high resolution and custom encoding schemes.

Refer now to FIG. 6, which illustrates an encoder 400 according to one embodiment of the present invention. Encoder 400 has one or more absolute position encoding tracks such as tracks 401 and 402 on a code disk 403. These tracks taken together provide an absolute position readout at a number of predetermined angular positions. The absolute position is measured relative to a fixed origin position 432 on the code disk. The absolute position tracks can be a plurality of striped tracks in which different tracks have different stripe widths such as the scheme shown in FIG. 2. In this case, the data from all of the tracks is needed to provide the absolute position. A new absolute position is obtained each time a stripe on the most finely divided code track passes the detector associated with that track.

Alternatively, the individual tracks can be coded tracks in which each track includes a plurality of code sequences that provide an absolute position value corresponding to one of the bit positions in the code sequence. In this case, a single absolute encoding track can be used; however, the number of points at which the absolute position is known is substantially less since an absolute position is only known after each code sequence has been read.

Each track is read by a read head that includes one or more photodetectors. The read heads associated with tracks 401, 402, and 410 are shown at 421–423, respectively. The number and arrangement of photodiodes in each read head depends on the particular encoding scheme used for the track associated with that read head. In principle, any of the track encoding schemes described above can be used to implement the individual tracks on code disk 403.

Encoder 400 also includes an interpolation track 410 that preferably includes a code strip having a striped pattern such as that discussed above with reference to FIG. 3. In this case, read head 423 has 4 photodetectors and the appropriate signal processing circuitry to provide a signal having transitions that are counted in counter 412. Read head 423 also provides the necessary control signals that cause counter 412 to either increment or decrement on the next transition, depending on the direction of travel of code disk 403 in a manner analogous to that described above with reference to FIGS. 3–5. The count in counter 412 is used by controller 430 to interpolate the position of the encoding disk 403 between absolute position readings. Each time a new absolute position is determined from the absolute position tracks 401–402, controller 430 resets the count in counter 412. Hence, the combination of the absolute position reading and the count in counter 412 provides a position readout that is more accurate than that provided by the absolute position decoder alone.

In one embodiment of the present invention, code disk 403 is constructed from the same type of light sensitive material that is used in DVD or CD recording. For example, commercially available DVD write once disks utilize spot sizes that are approximately 0.3 µm. Hence, an encoder having a resolution of approximately 16 bits at the diameter of the incremental track on a 5 mm disk can be constructed.

In addition to providing greater resolution, the use of write once DVD disks provides the ability to make inexpensive custom encoders. For example, encoders having different resolutions while using the same read hardware can be constructed. In addition, one or more inner tracks can be used to provide a custom state translation table. Consider an encoder having one absolute position track and the incremental interpolation track discussed above. The remainder of the encoding disk space can be utilized to store state information in which each absolute position is translated to a state value that is utilized by the apparatus connected to the encoder. For example, in one embodiment of the present invention, the absolute position is provided by track 402 that is encoded using a Gray code. The states to be output as the absolute position information are stored in track 401, which provides an output state value for each of the Gray code states. The position reported by the controller includes the output state information and the incremental location provided by counter 412. The reported information can also include the absolute position as represented by the Gray code state. The output state values can be used by the equipment connected to the encoder to control a number of switches or other electrical devices. In a conventional encoder, the equipment would need to be programmed to translate the absolute position to the state information. Hence, such an embodiment of the present invention, would eliminate the need for such translation in the equipment, and, in addition, allow the equipment to be reprogrammed easily by changing the encoding disk.

Finally, embodiments of the present invention that utilize this type of DVD technology benefit from the large economies of scale inherent in the customer DVD market. The read/write hardware and very inexpensive disks used for consumer products can be easily converted to shaft encoder uses.

The above-described embodiments of the present invention have been directed to a shaft encoder for providing the absolute position of a shaft relative to a fiducial position as the shaft rotates. However, the present invention is not limited to such shaft encoders. For example, the teachings of the present invention can be applied to linear encoders in which the code strip carrier moves along a linear path relative to a fixed fiducial position.

Various modifications to the present invention will become apparent to those skilled in the art from the foregoing description and accompanying drawings. Accordingly, the present invention is to be limited solely by the scope of the following claims.

What is claimed is:

1. An apparatus comprising:
   a code strip carrier having a plurality of code tracks thereon;
   an illumination system for illuminating said code tracks to generate a light signal from each code track, each code track comprising a plurality of dark and light stripes, said dark stripes generating a light signal having a lower intensity than the light signal generated by said light stripes;
   a plurality of read heads, each read head comprising a photodetector positioned to detect light from a corresponding one of said code tracks as that code track moves relative to said read head;

a controller for generating an absolute position value related to the position of said code strip carrier relative to an origin position, wherein one of said code tracks comprises a first absolute position track that provides an indication of said absolute position value when said code strip carrier is at each of a plurality of predetermined absolute positions relative to said origin position; and a different one of said code tracks comprises an incremental position track for generating a digital value indicative of a displacement of said code strip carrier relative to the last predetermined absolute position, wherein said incremental position track comprises alternating dark and light stripes and wherein said read head corresponding to said incremental position track generates a first logic signal indicating the direction of travel of said code strip carrier relative to that read head and a second logic signal that changes state each time a boundary between a dark stripe and a light stripe passes under that read head, wherein said first logic signal is responsive to a change in said direction of travel independent of the position of said first absolute position track relative to said one of said read heads corresponding to said first absolute position track.

2. An apparatus comprising:

a code strip carrier having a plurality of code tracks thereon;

an illumination system for illuminating said code tracks to generate a light signal from each code track, each code track comprising a plurality of dark and light stripes, said dark stripes generating a light signal having a lower intensity than the light signal generated by said light stripes;

a plurality of read heads, each read head comprising a photodetector positioned to detect light from a corresponding one of said code tracks as that code track moves relative to said read head;

a controller for generating an absolute position value related to the position of said code strip carrier relative to an origin position, wherein one of said code tracks comprises a first absolute position track that provides an indication of said absolute position value when said code strip carrier is at each of a plurality of predetermined absolute positions relative to said origin position; and a different one of said code tracks comprises an incremental position track for generating a digital value indicative of a displacement of said code strip carrier relative to the last predetermined absolute position, wherein said incremental position track comprises alternating dark and light stripes and wherein said read head corresponding to said incremental position track generates a first logic signal indicating the direction of travel of said code strip carrier relative to that read head and a second logic signal that changes state each time a boundary between a dark stripe and a light stripe passes under that read head, wherein said first absolute position track comprises a plurality of unique code sequences distributed on said absolute position track, each code sequence indicating that one of said predetermined absolute positions has been passed when a predetermined stripe in that code sequence has passed said read head corresponding to said absolute position track, wherein said predetermined strips are equally spaced on said code strip carrier.

3. An apparatus comprising:

a code strip cater having a plurality of code tracks thereon;

an illumination system for illuminating said code tracks to generate a light signal from each code track, each code track comprising a plurality of dark and light stripes, said dark stripes generating a light signal having a lower intensity than the light signal generated by said light stripes;

a plurality of read heads, each read head comprising a photodetector positioned to detect light from a corresponding one of said code tracks as that code track moves relative to said read head;

a controller for generating an absolute position value related to the position of said code strip carrier relative to an origin position, wherein one of said code tracks comprises a first absolute position track that provides an indication of said absolute position value when said code strip carrier is at each of a plurality of predetermined absolute positions relative to said origin position; and a different one of said code tracks comprises an incremental position track for generating a digital value indicative of a displacement of said code strip carrier relative to the last predetermined absolute position, wherein said code strip carrier comprises a reflective medium having a reflectivity that is altered by exposing said medium to light of an intensity greater than a predetermined intensity.

4. The apparatus of claim 1 wherein one of said tracks other than said first absolute position track and incremental position track comprises a state track that provides a state value corresponding to each of a plurality of said absolute position values and wherein said controller outputs said state value when said controller outputs said absolute position value, said state value being different from said absolute position value or said digital value indicate of said displacement of said code strip carrier.

5. A method for determining the position of a code strip carrier relative to a predetermined origin position, said method comprising:

providing a plurality of code tracks on said code strip carrier;

illuminating said code tracks to generate a light signal from each code track, each code track comprising a plurality of dark and light stripes, said dark stripes generating a light signal having a lower intensity than the light signal generated by said light stripes;

providing a plurality of read heads, each read head positioned to detect light from a corresponding one of said code tracks as that code track moves relative to said read head, said read head generating a signal indicative of the intensity of light reaching that read head;

generating an absolute position value related to the position of said code strip carrier relative to an origin position, wherein one of said code tracks comprises a first absolute position track that provides an indication of said absolute position value when said code strip carrier is at each of a plurality of predetermined absolute positions relative to said origin position; and a different one of said code tracks comprises an incremental position track for generating a digital value indicative of a displacement of said code strip carrier relative to the last predetermined absolute position, wherein said incremental position track comprises alternating dark and light stripes and wherein said read head corresponding to said incremental position track generates a first logic signal indicating the direction of travel of said code strip carrier relative to that read head and a second logic signal that changes state each time a boundary between a dark stripe and a light stripe passes under that read head, wherein said first logic signal is responsive to a change in said direction of travel independent of the position of said first absolute position track relatative to said one of said read heads corresponding to said first absolute position track.

6. A method for determining the position of a code strip carrier relative to a predetermined origin position, said method comprising:

providing a plurality of code tracks on said code strip carrier;

illuminating said code tracks to generate a light signal from each code track, each code track comprising a plurality of dark and light stripes, said dark stripes generating a light signal having a lower intensity than the light signal generated by said light stripes;

providing a plurality of read beads, each read head positioned to detect light from a corresponding one of said code tracks as that code track moves relative to said read head, said read head generating a signal indicative of the intensity of light reaching that read head;

generating an absolute position value related to the position of said code strip carrier relative to an origin position, wherein one of said code tracks comprises a first absolute position track that provides an indication of said absolute position value when said code strip carrier is at each of a plurality of predetermined absolute positions relative to said origin position; and a different one of said code tacks comprises an incremental position track for generating a digital value indicative of a displacement of said code strip carrier relative to the last predetermined absolute position, wherein said incremental position track comprises alternating dark and light stripes and wherein said read head corresponding to said incremental position track generates a first logic signal indicating the direction of travel of said code strip carrier relative to that read head and a second logic signal that changes state each time a boundary between a dark stripe and a light stripe passes under that read head, wherein said first absolute position track comprises a plurality of unique code sequences distributed on said absolute position track, each code sequence indicating that one of said predetermined absolute positions has been passed when a predetermined stripe in that code sequence has passed said read head corresponding to said absolute position track, wherein said predetermined strips are equally spaced on said code strip carrier.

7. A method for determining the position of a code strip carrier relative to a predetermined origin position, said method comprising:

providing a plurality of code tracks on said code strip carrier;

illuminating said code tracks to generate a light signal from each code track, each code track comprising a plurality of dark and light stripes, said dark stripes generating a light signal having a lower intensity than the light signal generated by said light stripes;

providing a plurality of read heads, each read head positioned to detect light from a corresponding one of said code tracks as that code track moves relative to said read head, said read head generating a signal indicative of the intensity of light reaching that read head;

generating an absolute position value related to the position of said code strip carrier relative to an origin position, wherein one of said code tracks comprises a first absolute position track that provides an indication of said absolute position value when said code strip carrier is at each of a plurality of predetermined absolute positions relative to said origin position; and a different one of said code tracks comprises an incremental position track for generating a digital value indicative of a displacement of said code strip carrier relative to the last predetermined absolute position, wherein said code strip carrier comprises a reflective medium having a reflectivity that is altered by exposing said medium to light of an intensity greater than a predetermined intensity.

8. The method of claim 5 wherein one of said tracks other than said first absolute position track and said incremental position track comprises a state track that provides a state value corresponding to each of a plurality of said absolute position values and wherein said controller outputs said state value when said controller outputs said absolute position value, said state value being different from said absolute position value and said digital value indicate of said displacement of said code strip carrier.

* * * * *

UNITED STATES PATENT AND TRADEMARK OFFICE
CERTIFICATE OF CORRECTION

| | |
|---|---|
| PATENT NO. | : 7,112,781 B2 |
| APPLICATION NO. | : 10/829494 |
| DATED | : September 26, 2006 |
| INVENTOR(S) | : Sheau Yang Ch'ng |

Page 1 of 1

It is certified that error appears in the above-identified patent and that said Letters Patent is hereby corrected as shown below:

Column 8, Line 5, Claim 3, delete "cater" and insert -- carrier --;

Column 9, Line 12, Claim 5, delete "relatative" and insert -- relative --;

Column 9, Line 24, Claim 6, delete "beads," and insert -- heads --;

Column 9, Line 38, Claim 6, delete "tacks" and insert -- tracks --.

Signed and Sealed this

Eighth Day of June, 2010

David J. Kappos
*Director of the United States Patent and Trademark Office*